United States Patent [19]

Inoue

[11] Patent Number: 5,615,560
[45] Date of Patent: Apr. 1, 1997

[54] AUTOMOTIVE AIR CONDITIONER SYSTEM

[75] Inventor: Atsuo Inoue, Sawa-gun, Japan

[73] Assignee: Sanden Corporation, Gunma, Japan

[21] Appl. No.: 633,166

[22] Filed: Apr. 16, 1996

[30] Foreign Application Priority Data

Apr. 17, 1995 [JP] Japan ......................................... 7-91163

[51] Int. Cl.⁶ ............................ F25B 41/00; G05D 27/00
[52] U.S. Cl. ............................. 62/212; 62/225; 236/92 B
[58] Field of Search ............................ 236/92 B; 62/212, 62/225

[56] References Cited

U.S. PATENT DOCUMENTS

| 2,511,565 | 6/1950 | Carter | 236/92 B X |
| 2,542,802 | 2/1951 | Ehlke | 236/92 B |
| 4,979,372 | 12/1990 | Tanaka | 62/225 |
| 5,477,700 | 12/1995 | Iio | 62/90 X |

FOREIGN PATENT DOCUMENTS

| 0513568 | 11/1992 | European Pat. Off. . |
| 0681933 | 11/1995 | European Pat. Off. . |
| 0691229 | 1/1996 | European Pat. Off. . |

Primary Examiner—William E. Wayner
Attorney, Agent, or Firm—Baker & Botts, L.L.P.

[57] ABSTRACT

An automotive air conditioning system comprises a heat pump type refrigerant circuit charged with a first refrigerant and includes first and second internal heat exchangers disposed within an air conditioning duct and an external heat exchanger located outside the duct. A plurality of electromagnetic valves are selectively operated so that in one operational state the external heat exchanger performs as an evaporator and the second internal heat exchanger performs as a condenser, and such that in another operational state the external heat exchanger and the first internal heat exchanger perform as evaporators and the second internal heat exchanger performs as a condenser. A first pressure equalizing type expansion valve mechanism associated with the external heat exchanger has a P–T characteristic curve wherein a static superheat curve intersects with a saturated first refrigerant vapor curve when the temperature of the first refrigerant immediately upstream of the external heat exchanger is in a low range. A second pressure equalizing type expansion valve mechanism has a P–T characteristic curve wherein a static superheat curve generally extends parallel to a saturated first refrigerant vapor curve.

15 Claims, 9 Drawing Sheets

AUTOMOTIVE AIR CONDITIONER SYSTEM

BACKGROUND OF THE INVENTION

1. Technical Field of the Invention

This invention generally relates to an automotive air conditioning system, and more particularly, to an automotive air conditioning system having a heat pump type refrigerant circuit.

2. Description of the Prior Art

Automotive air conditioning systems having a heat pump type refrigerant circuit are well known in the prior art.

With reference to FIG. 1, one conventional automotive air conditioning system 100' comprises a heat pump type refrigerant circuit 10' which includes a compressor, such as a variable displacement type motor driven compressor 11, a first internal heat exchanger 12, a second internal heat exchanger 13, a receiver 14 and an external heat exchanger 15, which are connected to one another by pipe members 20 in a manner described in detail below.

An outlet port 11b of compressor 11 is linked to an inlet port 13a of second internal heat exchanger 13 via a first electromagnetic valve 161. An outlet port 13b of second internal heat exchanger 13 is linked to an inlet port 14a of receiver 14 via a first check valve 171. An inlet port 11a of compressor 11 is linked to an outlet port 12b of first internal heat exchanger 12. A first port 15a of external heat exchanger 15 is linked to pipe member 20 at a position which is located between inlet port 11a of compressor 11 and outlet port 12b of first internal heat exchanger 12 via a second electromagnetic valve 162. First port 15a of external heat exchanger 15 is further linked to pipe member 20 at a position which is located between outlet port 11b of compressor 11 and first electromagnetic valve 161 via a third electromagnetic valve 163.

A second port 15b of external heat exchanger 15 is linked to inlet port 14a of receiver 14 via a second check valve 172. An outlet port 14b of receiver 14 is linked to an inlet port 12a of first internal heat exchanger 12 via a fourth electromagnetic valve 164 and a second valve device 502 of a later-mentioned second external pressure equalizing type thermal-sensitive expansion valve mechanism 52. Outlet port 14b of receiver 14 is further linked to second port 15b of external heat exchanger 15 via a first valve device 501 of a later-mentioned first external pressure equalizing type thermal-sensitive expansion valve mechanism 51.

The automotive air conditioning system 100' further comprises a duct 110 within which first internal heat exchanger 12, second external heat exchanger 13 and a blower 120 are disposed. An air intake port 111 is formed at one end of duct 110. Blower 120 is located at a position adjacent to air intake port 111, and moves the air from air intake port 111 to the opposite end of duct 110. A first damper 130 is associated with air intake port 111, and pivotally moves so that fresh outside air or recirculated passenger compartment air can be selectively taken into duct 110 through air intake port 111.

First internal heat exchanger 12 is disposed within duct 110 at a position downstream of blower 120. Second internal heat exchanger 13 is located at a position downstream to first internal heat exchanger 12. Second internal heat exchanger 13 occupies about one half of the cross sectional area of duct 110. A second damper 140 is associated with second internal heat exchanger 13 at a position immediately upstream with respect to heat exchanger 13, and pivotally moves so that the flow of air passing through second internal heat exchanger 13 is continuously regulated.

The other end of duct 110 opposite to air intake port 111 branches into first and second auxiliary ducts 110a and 110b. First auxiliary duct 110a conducts the air to an automobile front windshield (not shown). The second auxiliary duct 110b conducts the air to a front lower portion of the automobile passenger compartment.

A first thermo-sensor 30 is associated with first internal heat exchanger 12 at a position downstream with respect to heat exchanger 12, and senses temperature $T_{eva}$ of the air flowing out from heat exchanger 12. The sensed temperature $T_{eva}$ is converted to an electric signal $S_{eva}$ at first thermo-sensor 30, and electric signal $S_{eva}$ is sent to a control unit (not shown) to be processed therein. A second thermo-sensor 40 is associated with second internal heat exchanger 13 at a position downstream with respect to heat exchanger 13, and senses temperature $T_{mix}$ of the air flowing through heat exchanger 13. The sensed temperature $T_{mix}$ is converted to an electric signal $S_{mix}$ at second thermo-sensor 40, and electric signal $S_{mix}$ is sent to the control unit to be processed therein.

The heat pump type refrigeration circuit 10' of the automotive air conditioning system 100' is provided with first and second external pressure equalizing type expansion valve mechanisms 51 and 52. First external pressure equalizing type expansion valve mechanism 51 includes a first valve device 501, a first pressure equalizing pipe 51a which functions as a pressure sensing device, and a first thermo-sensing tube 51b, which functions as a thermo-sensing device. Similarly, second external pressure equalizing type expansion valve mechanism 52 includes a second valve device 502, a second pressure equalizing pipe 52a, which functions as a pressure sensing device, and a second thermo-sensing tube 52b, which functions as a thermo-sensing device.

With reference to FIG. 2 in conjunction with FIG. 1, first valve device 501 is disposed in pipe member 20 at a position between second port 15b of external heat exchanger 15 and outlet port 14b of receiver 14. One end of first pressure equalizing pipe 51a is hermetically inserted into an inner space of tube member 20 between first port 15a of external heat exchanger 15 and second electromagnetic valve 162. First thermo-sensing tube 51b is fixedly attached to an external surface of tube member 20 between second electromagnetic valve 162 and inlet port 11a of compressor 11.

First valve device 501 includes a casing 511, which defines a pressure sensitive operating chamber 512, and a diaphragm 513 disposed within and dividing chamber 512 into a first section 512a and a second section 512b. An operating rod 514 is disposed within second section 512b of chamber 512, and one end thereof slidably penetrates through casing 511 and is located in a communicating chamber 515, which is formed in casing 511. The communicating chamber 515 is in fluid communication with pipe member 20. Valve element 514a is integrally formed at one end of rod 514, and is resiliently supported by a coil spring 516. Coil spring 516 is disposed between valve element 514a and a supporting member 517, which is fixedly secured to an inner surface of communicating chamber 515. Operating rod 514 is continuously urged upwardly (with respect to FIG. 2) by the restoring force of coil spring 516. As a result, the end of operating rod 514 is continuously in contact with a central portion of diaphragm 513. A valve seat 518 is formed in communicating chamber 515 facing valve element 514a.

First thermo-sensing tube 51b is linked to the first section 512a of pressure sensitive operating chamber 512 through pipe member 51c. First pressure equalizing pipe 51a is connected to the second section 512b of pressure sensitive operating chamber 512. First thermo-sensing tube 51b, pipe member 51c and first section 512a of pressure sensitive operating chamber 512 are charged with refrigerant. The refrigerant charge is maintained at the saturated vapor pressure, which varies in accordance with the Mollier diagram.

An upper surface of diaphragm 513 receives the pressure of the refrigerant charged into first thermo-sensing tube 51b, pipe member 51c and first section 512a of chamber 512 such that a first force acts on diaphragm 513. The first force varies in response to changes in the temperature sensed by first thermo-sensing tube 51b. The lower surface of diaphragm 513 receives the pressure of the refrigerant at a position adjacent to first port 15a of external heat exchanger 15. Thus, an upwardly acting second force acts on diaphragm 513. The second force varies in response to changes in the pressure of the refrigerant in tube member 20 at the position adjacent to first port 15a of external heat exchanger 15. Therefore, a central portion of diaphragm 513 moves in accordance with the first force, the second force and the restoring force of coil spring 516, and rod 514 moves upwardly and downwardly in accordance with the movement of the central portion of diaphragm 513. As a result, the opening degree of valve element 514a at valve seat 518 varies in accordance with the movement of the central portion of diaphragm 513, so that first external pressure equalizing type expansion valve mechanism 51 has a P–T characteristic curve as illustrated in FIG. 3.

In FIG. 3, dashed line $C_1$ indicates a saturated refrigerant vapor curve, and solid line $C'_2$ indicates a static superheat curve with respect to both the first and second external pressure equalizing type expansion valve mechanisms 51, 52. $SH_2$ indicates the degree of static superheat adjacent to first port 15a of external heat exchanger 15. As illustrated in FIG. 3, the static superheat curve $C'_2$ is generally parallel to the saturated refrigerant vapor curve $C_1$. Therefore, the static superheat $SH_2$ is generally maintained at a predetermined constant value in any thermal condition of external heat exchanger 15.

With reference to FIG. 1 again, second valve device 502 is positioned between inlet port 12a of first internal heat exchanger 12 and fourth electromagnetic valve 164. One end of second pressure equalizing pipe 52a is hermetically inserted into tube member 20 at a position adjacent to outlet port 12b of first internal heat exchanger 12. Second thermo-sensing tube 52b is positioned adjacent to outlet port 12b of first internal heat exchanger 12, but downstream to second pressure equalizing pipe 52a. Second valve device 502 is similar in construction and operation to first valve device 501, so a detailed explanation is omitted.

Depending on the operational state of first through fourth electromagnetic valves 161–164, the automotive air conditioning system 100' performs in four operating modes: a cooling mode, a cooling-dehumidifying mode, a heating mode and a heating-dehumidifying mode.

First, in the cooling mode, first and second electromagnetic valves 161 and 162 are closed, and third and fourth electromagnetic valves 163 and 164 are open. Refrigerant flowing from compressor 11 flows to external heat exchanger 15 via third electromagnetic valve 163, and further flows to first internal heat exchanger 12 via second check valve 172, receiver 14, fourth electromagnetic valve 164 and second valve device 502. Then, the refrigerant returns to compressor 11 to complete the cycle. In the cooling mode, external heat exchanger 15 performs as a condenser while first internal heat exchanger 12 performs as an evaporator, which functions as a cooling source. Therefore, as the air flows through duct 110, the air is cooled by first internal heat exchanger 12. Furthermore, second damper 140 is positioned as indicated by the dashed line in FIG. 1 (i.e., entirely blocked), so that the air cooled by first internal heat exchanger 12 entirely passes second internal heat exchanger 13. The air cooled by first internal heat exchanger 12 is directed against the front windshield and/or the front lower portion of the automobile passenger compartment through the first and/or second auxiliary ducts 110a and/or 110b, respectively.

The electric signal $S_{eva}$ representing the sensed temperature $T_{eva}$ of the air at the position immediately downstream to first internal heat exchanger 12 is processed in the control unit. In response, the rotating speed of the drive shaft of compressor 11 is controlled. In other words, the displacement of compressor 11 is controlled so that the sensed temperature $T_{eva}$ approaches an aimed temperature Tao, which is expressed by equation (1).

$$Tao = K_s \cdot T_s - K_r \cdot T_r - K_{am} \cdot T_{am} - K_{rad} \cdot T_{rad} + C \tag{1}$$

where;

$K_s$ is the set temperature coefficient representative of impurities in the automobile passenger compartment air, $T_s$ is the set temperature of the automobile passenger compartment, $K_r$ is the sensed temperature coefficient in the automobile passenger compartment, $T_r$ is the sensed temperature in the automobile passenger compartment, $K_{am}$ is the ambient temperature coefficient outside the automobile, $T_{am}$ is the ambient temperature outside the automobile, $K_{rad}$ is the coefficient of solar radiation, $T_{rad}$ is the amount of solar radiation, and C is a constant.

In the cooling-dehumidifying mode, second electromagnetic valve 162 is closed, and the first, third and fourth electromagnetic valves 161, 163 and 164 are open. A portion of the refrigerant flowing from compressor 11 flows to external heat exchanger 15 via third electromagnetic valve 163, while the remainder flows to second internal heat exchanger 13 via first electromagnetic valve 161. The refrigerant flowing from external heat exchanger 15 and the refrigerant flowing from second internal heat exchanger 13 merge at receiver 14 via second and first check valves 172 and 171, respectively. The refrigerant then flows to first internal heat exchanger 12 via fourth electromagnetic valve 164 and second valve device 502, and returns to compressor 11. In the cooling-dehumidifying mode, external heat exchanger 15 and second internal heat exchanger 13 perform as condensers, while first internal heat exchanger 12 functions as an evaporator and cooling source. Second damper 140 is partially open. The position of the second damper 140 is determined by equation (2) below.

$$(Tao - T_{eva})/(T_{mix} - T_{eva}) \tag{2}$$

As the air flows through duct 110, the air is cooled by first internal heat exchanger 12. The cooled air flowing out from first internal heat exchanger 12 is parted by second damper 140, so that a portion thereof passes through second internal heat exchanger 13 to be heated, while the remainder bypasses second internal heat exchanger 13. The air then merges at a position downstream to second internal heat exchanger 13. The merged air, which is cooled and dehumidified, is directed against the automobile front windshield and/or the front lower portion of the automobile passenger compartment through the first and/or second auxiliary ducts 110a and/or 110b, respectively.

The electric signal $S_{eva}$ representing the sensed temperature $T_{eva}$ of the air at the position immediately downstream to first internal heat exchanger 12 is processed in the control unit. In response, the rotating speed of the drive shaft of compressor 11 is controlled. In other words, the displacement of compressor 11 is controlled so that the sensed temperature $T_{eva}$ approaches the aimed temperature Tad.

In the heating mode, first and second electromagnetic valves 161 and 162 are open, and third and fourth electromagnetic valves 163 and 164 are closed. The refrigerant flowing from compressor 11 flows to second internal heat exchanger 13 via first electromagnetic valve 161, and further flows to external heat exchanger 15 via first check valve 171, receiver 14 and first valve device 501. The refrigerant flowing out of external heat exchanger 15 returns to compressor 11 via second electromagnetic valve 162. In the heating mode, external heat exchanger 15 performs as an evaporator, while second internal heat exchanger 13 performs as a condenser, which functions as a heating source. Furthermore, second damper 140 is positioned as indicated by the solid line in FIG. 1 (i.e., entirely opened), so that the air entirely passes through second internal heat exchanger 13. As the air flows through duct 110, the air passes through first internal heat exchanger 12 without a heat exchanging operation. The air flowing from first internal heat exchanger 12 entirely passes through second internal heat exchanger 13, and is heated thereby. The air heated by second internal heat exchanger 13 is directed against the automobile front windshield and/or the front lower portion of the automobile passenger compartment through the first and/or second auxiliary ducts 110a and/or 110b, respectively.

The electric signal $S_{mix}$ representing the sensed temperature $T_{mix}$ of the air at the position immediately downstream of second internal heat exchanger 13 is processed in the control unit. In response, the rotating speed of the drive shaft of compressor 11 is controlled. In other words, the displacement of compressor 11 is controlled so that the sensed temperature $T_{mix}$ approaches the aimed temperature Tao.

In the heating-dehumidifying mode, third electromagnetic valve 163 is closed, and the first, second and fourth electromagnetic valves 161, 162 and 164 are open. As a result, the refrigerant flowing from compressor 11 flows to second internal heat exchanger 13 via first electromagnetic valve 161, and further flows to receiver 14 via first check valve 171. The refrigerant flowing from receiver 14 divergently flows to external heat exchanger 15 via first valve device 501 and first internal heat exchanger 12 via fourth electromagnetic valve 164 and second valve device 502. The refrigerant flowing from first internal heat exchanger 12 merges with the refrigerant flowing from external heat exchanger 15 via second electromagnetic valve 162, and returns to compressor 11. In the heating-dehumidifying mode, external heat exchanger 15 and first internal heat exchanger 12 perform as evaporators, which function as cooling sources, while second internal heat exchanger 13 performs as a condenser, which functions as a heating source. Second damper 140 is maintained at the position indicated by the solid line in FIG. 1 (i.e., entirely opened).

As the air flows through duct 110, the air is cooled by first internal heat exchanger 12. The cooled air flowing from first internal heat exchanger 12 entirely passes through second internal heat exchanger 13, where it is heated. The air heated by second internal heat exchanger 13 is directed to the automobile front windshield and/or the front lower portion of the automobile passenger compartment through the first and/or second auxiliary ducts 110a and/or 110b, respectively.

The electric signal $S_{mix}$ representing the sensed temperature $T_{mix}$ of the air at the position immediately downstream of second internal heat exchanger 13 is processed in the control unit. In response, the rotating speed of the drive shaft of compressor 11 is controlled. In other words, the displacement of compressor 11 is controlled so that the sensed temperature $T_{mix}$ approaches the aimed temperature Tao.

When the heating mode is carried out and the temperature of the air outside the automobile is low, for example, $-5°$ C. $\sim 0°$ C., the vaporizing pressure of the refrigerant in external heat exchanger 15 lowers, i.e, the temperature of the refrigerant in external heat exchanger 15 tends to lower. Since the condensing pressure of the refrigerant in second internal heat exchanger 13 is high, the pressure in the discharge chamber of compressor 11 tends to rise. These tendencies are aggravated when the degree of actual superheat $SH_2a$ at a position adjacent to first port 15a of external heat exchanger 15 becomes excessively greater then the predetermined constant value of static superheat $SH_2$. As a result, the operational efficiency of compressor 11 may decrease. A situation where the degree of actual superheat $SH_2a$ becomes excessively greater than the degree of static superheat $SH_2$ is described in detail below with reference to FIGS. 4 and 5.

As illustrated in FIG. 5, the amount of increase in the degree of superheat $SH_2c$ at a position adjacent to first port 15a of external heat exchanger 15 is in direct proportion to the opening degree of valve element 514a (FIG. 2). On the other hand, when the temperature of the air outside the automobile is low, the opening degree of valve element 514a must be large. Therefore, when the temperature of the air outside the automobile is low, the increase in the degree of static superheat SHc at the position adjacent to first port 15a of external heat exchanger 15 becomes large. As a result, as illustrated in FIG. 4, a first acting point $P_1$ of the first external pressure equalizing type expansion valve mechanisms 51 responsive to pressure sensed by first pressure equalizing pipe 51a is shifted from the static superheat curve $C'_2$ along the axis of the abscissas toward the right (with respect to FIG. 4) by SHc.

In addition, a pressure drop $\Delta P$ occurs between the position first pressure equalizing pipe 51a which is inserted in tube member 20 and first thermo-sensing tube 51b. As a result, as illustrated in FIG. 4, the pressure of the first external pressure equalizing type expansion valve mechanisms 51 sensed by first thermo-sensing tube 51b shifts to second acting point $P_2$ along the axis of the ordinate. The second acting point $P_2$ of the first external pressure equalizing type expansion valve mechanisms 51 is located on an actual superheat curve $C'_3$.

As illustrated in FIG. 4, when the temperature of the air outside the automobile is low, the degree of actual superheat $SH_2a$ becomes excessively greater than the predetermined constant value of the degree of static superheat $SH_2$. In other words, as the temperature of the air outside the automobile lowers, the actual superheat $SH_2a$ becomes greater.

Furthermore, the degree of actual superheat $SH_2a$ becomes excessively larger than the predetermined constant value of static superheat $SH_2$ when the temperature of the air outside the automobile is low. Therefore, the vaporizing pressure of the refrigerant in external heat exchanger 15 is further lowered, i.e., the temperature of the refrigerant in external heat exchanger 15 is further lowered. As a result, frost may form on the exterior surface of external heat exchanger 15 when the heating mode operation is carried out and the temperature of the air outside the automobile is low. The frost forming at the exterior surface of the external heat exchanger 15 may reduce the operational efficiency of the automotive air conditioning system 100'.

When the heating-dehumidifying mode is carried out and the temperature of the air outside the automobile is at an intermediate range, for example, 10° C.–20° C., the dehumidifying operation at first internal heat exchanger 12 is not sufficiently carried out. In the heating-dehumidifying mode of operation, the refrigerant flowing from receiver 14 flows into external heat exchanger 15 and first internal heat exchanger 12. The ratio of heat exchanging capacity of external heat exchanger 15 to heat exchanging capacity of first internal heat exchanger 12 is designed to be about 3–10:1. Therefore, the greater part of the refrigerant flowing from receiver 14 flows into external heat exchanger 15. As a result, the heat exchanging operation at first internal heat exchanger 12 is not sufficiently carried out, so that the temperature of the air blowing from first internal heat exchanger 12 does not sufficiently rise. Therefore, the dehumidifying operation at the first internal heat exchanger 12 is not sufficiently carried out.

SUMMARY OF THE INVENTION

Accordingly, it is an object of the present invention to provide a heat pump type automotive air conditioning system which improves the operational efficiency of a compressor during the heating mode.

Another object of the present invention is to provide a heat pump type automotive air conditioning system which can prevent frost from forming on the exterior surface of an external heat exchanger during the heating mode of operation.

A further object of the present invention is to provide a heat pump type automotive air conditioning system which can sufficiently carry out a dehumidifying operation in a heating-dehumidifying mode of operation.

According to the present invention, an automotive air conditioning system comprises a duct member which includes a first and a second end opposite to the first end, and a refrigerant circuit which includes first and second internal heat exchangers located within the duct member, and an external heat exchanger located outside the duct member. The duct member conducts air therethrough from the first end to the second end. The first internal heat exchanger is positioned upstream to the second internal heat exchanger.

The refrigerant circuit further includes changeover devices, such as a plurality of electromagnetic valves, for changing the direction of flow of the refrigerant such that in one mode of operation the external heat exchanger performs as an evaporator and the second internal heat exchanger performs as a condenser, and such that in another mode of operation the external heat exchanger and the first internal heat exchanger perform as an evaporator and the second internal heat exchanger performs as a condenser.

The refrigerant circuit still further comprises a first pressure equalizing type expansion valve mechanism, which is associated with the external heat exchanger, for regulating a flow amount of the first refrigerant flowing into the external heat exchanger in response to the temperature of the first refrigerant at a position upstream to the external heat exchanger. A second pressure equalizing type expansion valve mechanism is associated with the first internal heat exchanger so as to regulate a flow amount of the refrigerant flowing into the first internal heat exchanger in response to the temperature of the refrigerant at a position upstream to the first internal heat exchanger.

The first pressure equalizing type expansion valve mechanism is characterized by a static superheat curve which intersects a saturated first refrigerant vapor curve when the temperature of the first refrigerant at the position upstream to the external heat exchanger is low.

The second pressure equalizing type expansion valve mechanism is characterized by a static superheat curve which generally extends parallel to a saturated first refrigerant vapor curve.

BRIEF DESCRIPTION OF THE DRAWINGS

FIG. 1 is a schematic diagram of a heat pump type refrigeration circuit in accordance with the prior art.

DETAILED DESCRIPTION OF THE PREFERRED EMBODIMENT

Figure 6:
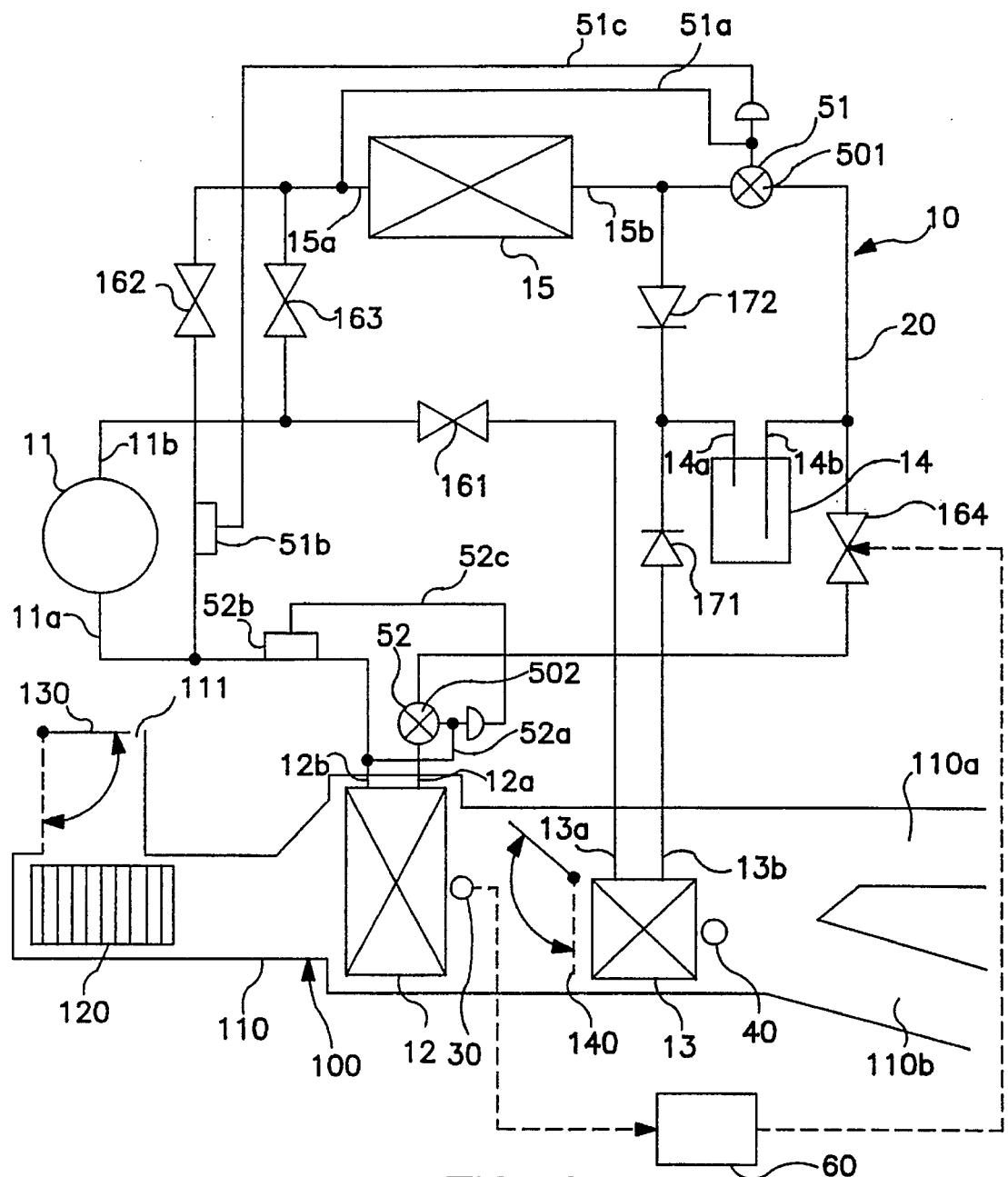
FIG. 6 is a schematic diagram of a heat pump type refrigeration circuit in accordance with a first preferred embodiment.
Figure 2:
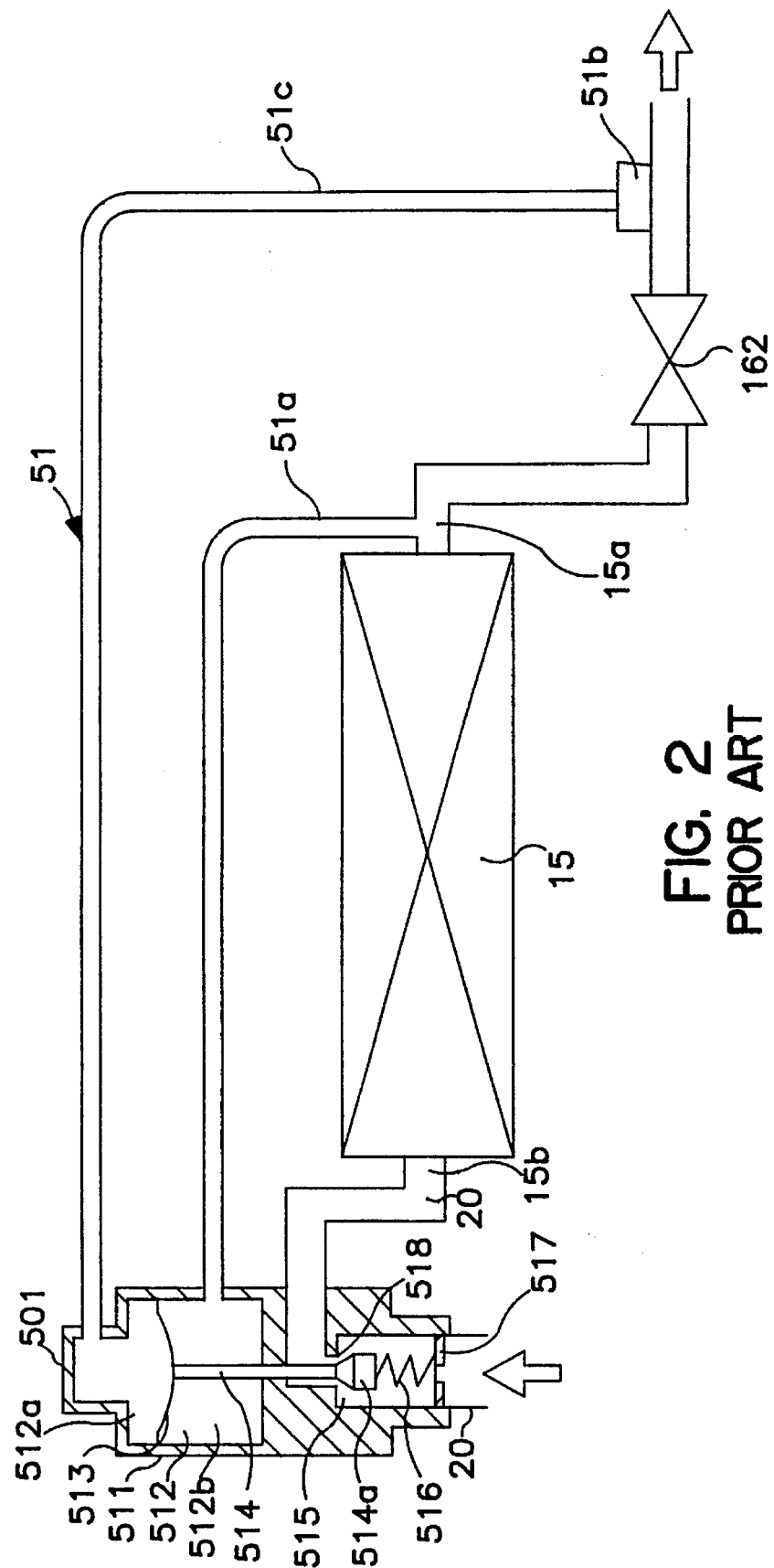
FIG. 2 is a schematic illustration of a first external pressure equalizing type expansion valve mechanism shown in FIG. 1.

FIG. 6 illustrates a schematic diagram of an automotive air conditioning system 100 in accordance with one preferred embodiment. In FIG. 6, the same numerals are used to denote corresponding elements shown in FIG. 1, so the discussion is primarily reserved for differences between the preferred embodiment and the prior art.

The automotive air conditioning system 100 of FIG. 6 also performs in four operating modes by means of selectively opening and closing the first through fourth electromagnetic valves 161–164.

Figure 7:
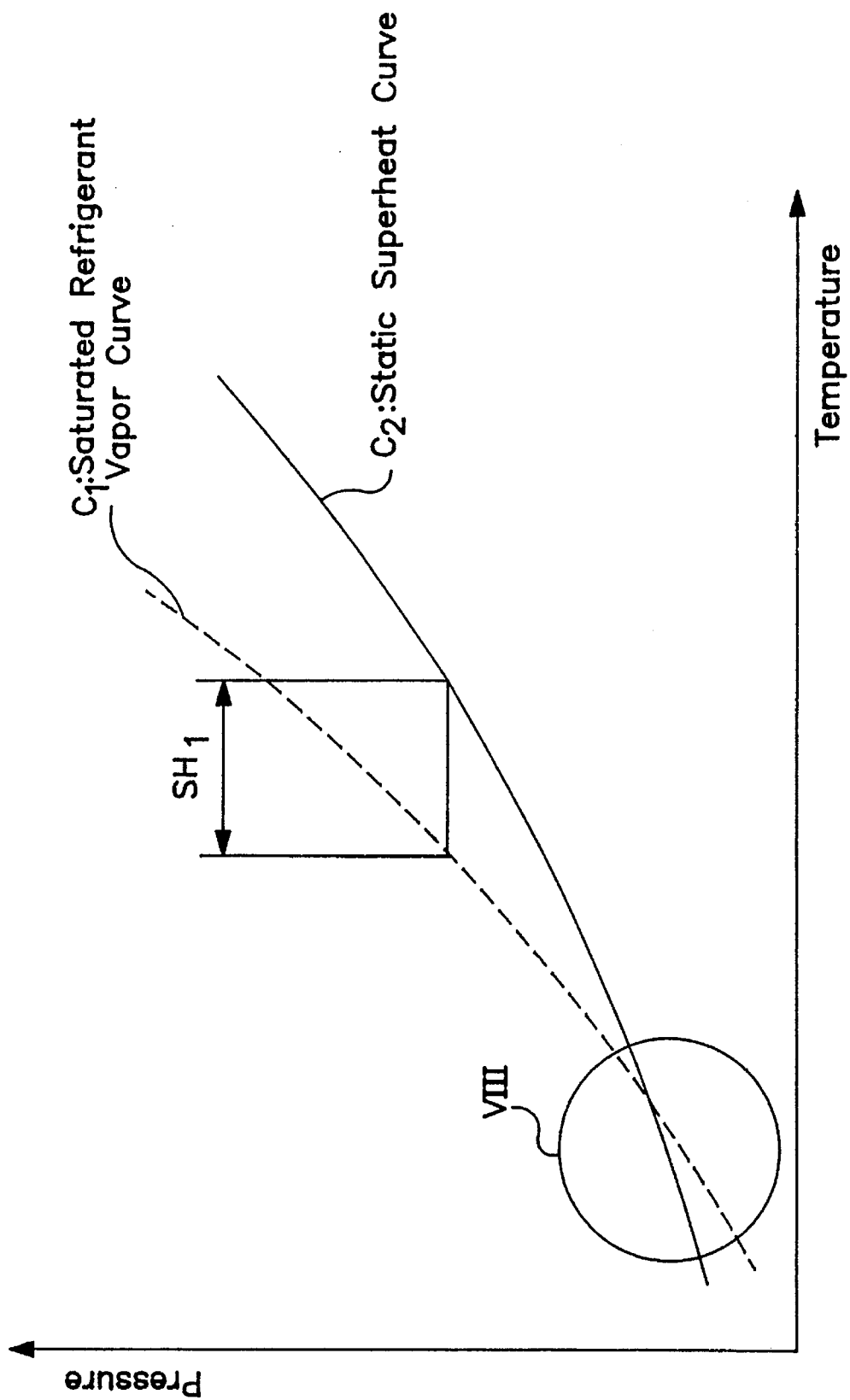
FIG. 7 is a graph illustrating a P–T characteristic curve of static superheat of the first external pressure equalizing type expansion valve mechanism shown in FIG. 6.

According to the preferred embodiment, first thermosensing tube 51b, pipe member 51c and first section 512a of pressure sensitive operating chamber 512 are charged with refrigerant, which is different from the refrigerant charged into refrigeration circuit 10. The refrigerant charged into tube 51b, pipe member 51c and first section 512a is maintained at the saturated vapor pressure, which varies in accordance with the Mollier diagram. The first external pressure equalizing type expansion valve mechanism 51 associated with external heat exchanger 15 has a P–T characteristic curve as illustrated in FIG. 7. In FIG. 7, the dashed line $C_1$ indicates the saturated refrigerant vapor curve, and the solid line $C_2$ indicates the static superheat curve with respect to the first external pressure equalizing type expansion valve mechanism 51.

According to the P–T characteristic curve of the first external pressure equalizing type expansion valve mechanism 51, as the temperature sensed by the first thermo-sensing tube 51*b* becomes lower, i.e., the temperature of the air outside the automobile becomes lower, the static superheat $SH_1$ adjacent to first port 15*a* of external heat exchanger 15 becomes smaller. In addition, when the temperature sensed by first thermo-sensing tube 51*b* is low, i.e., when the temperature of the ambient air outside the automobile is in a low range, for example, −5° C.~0° C., the solid line $C_2$ static superheat curve of first external pressure equalizing type expansion valve mechanism 51 intersects the dashed line $C_1$ of the saturated refrigerant vapor curve.

Figure 8:
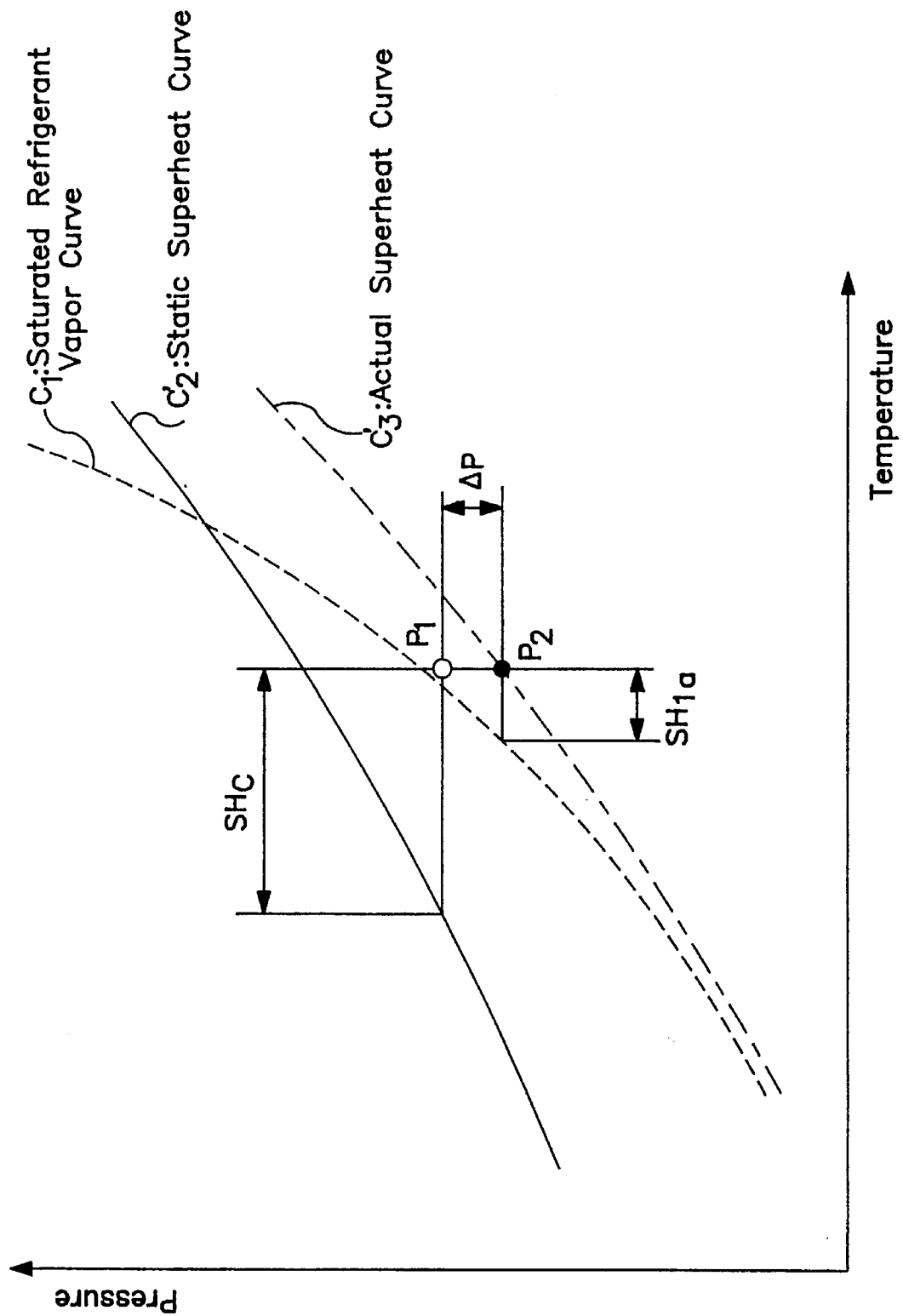
FIG. 8 is a graph illustrating an enlarged portion of FIG. 7 indicated by circle VIII.

FIG. 8 illustrates the P–T characteristic curve of the first external pressure equalizing type expansion valve mechanism 51 when the ambient temperature sensed by the first thermo-sensing tube 51*b* is in the low range, i.e., −5°~0° C. As illustrated in FIG. 8, line $C_3$, which indicates an actual superheat curve with respect to the first external pressure equalizing type expansion valve mechanism 51, does not intersect the dashed line $C_1$ indicating the saturated refrigerant vapor curve. Therefore, when the ambient temperature sensed by first thermo-sensing tube 51*b* is in the low range, i.e., in the situation where the temperature of the air outside the automobile is about −5° C.~0° C., actual superheat $SH_1a$ of the first external pressure equalizing type expansion valve mechanism 51 is small. In other words, as the temperature sensed by first thermo-sensing tube 51*b* lowers, i.e., as the temperature of the ambient air outside the automobile lowers, the degree of actual superheat $SH_1a$ with respect to the first external pressure equalizing type expansion valve mechanism 51 becomes smaller.

Accordingly, even when the heating mode of operation is carried out when the temperature of the ambient air outside the automobile is low, the operational efficiency of compressor 11 is maintained, and frost can be prevented from forming on the exterior surface of external heat exchanger 15.

Figure 3:
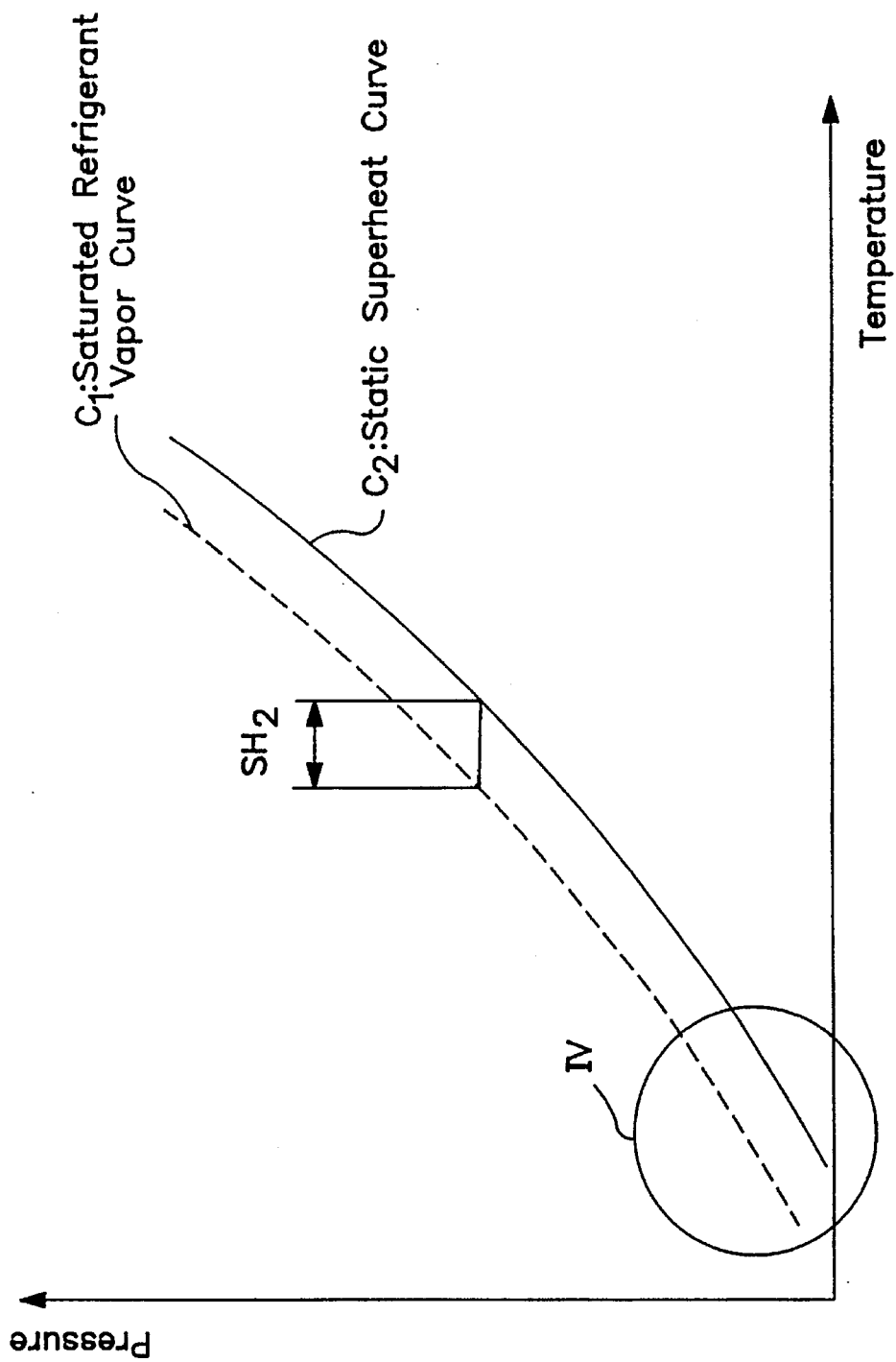
FIG. 3 is a graph illustrating a P–T characteristic curve of static superheat of the first external pressure equalizing type expansion valve mechanism shown in FIGS. 1 and 2.
Figure 4:
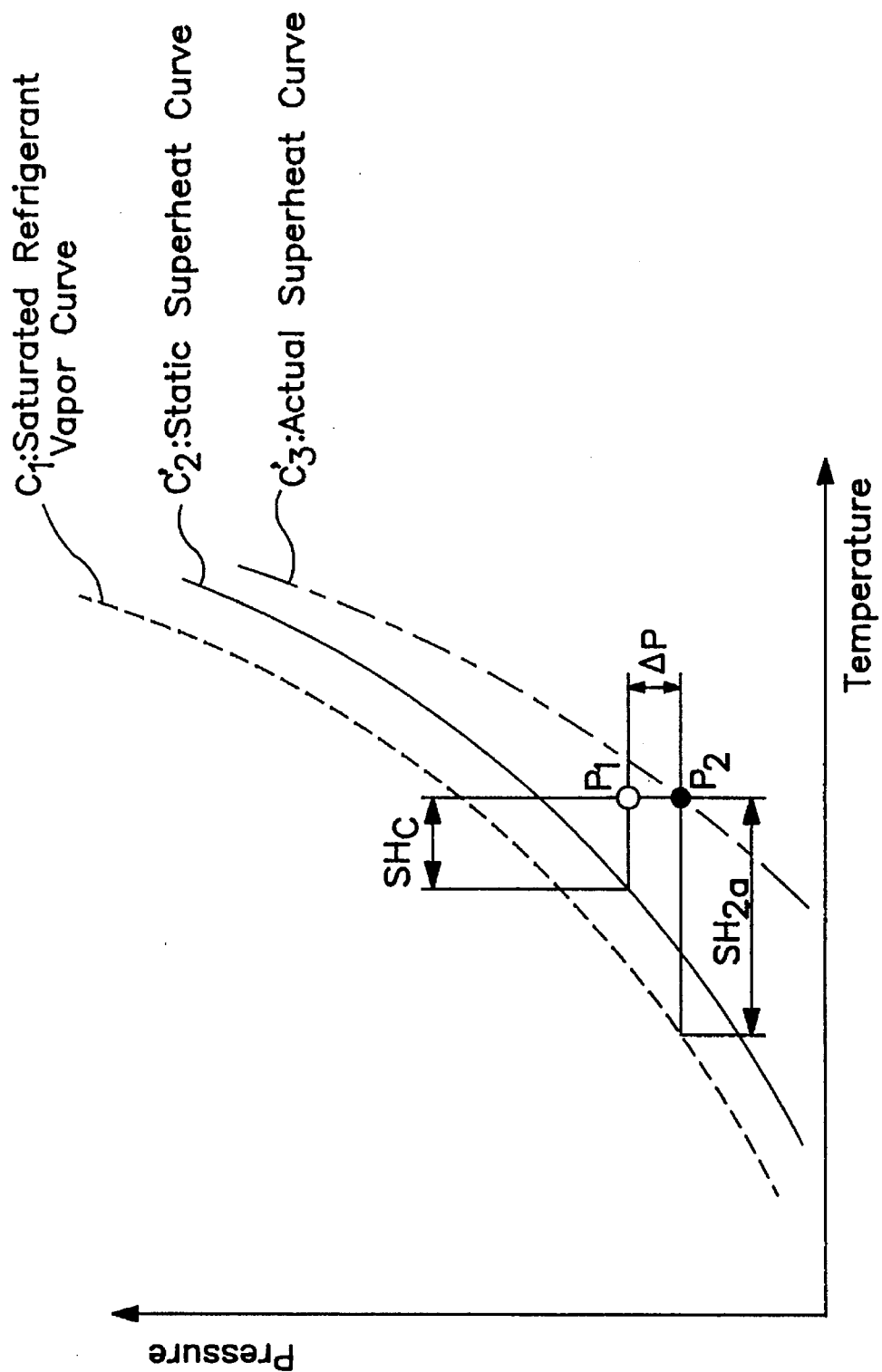
FIG. 4 is a graph illustrating an enlarged portion of FIG. 3 indicated by circle IV.
Figure 5:
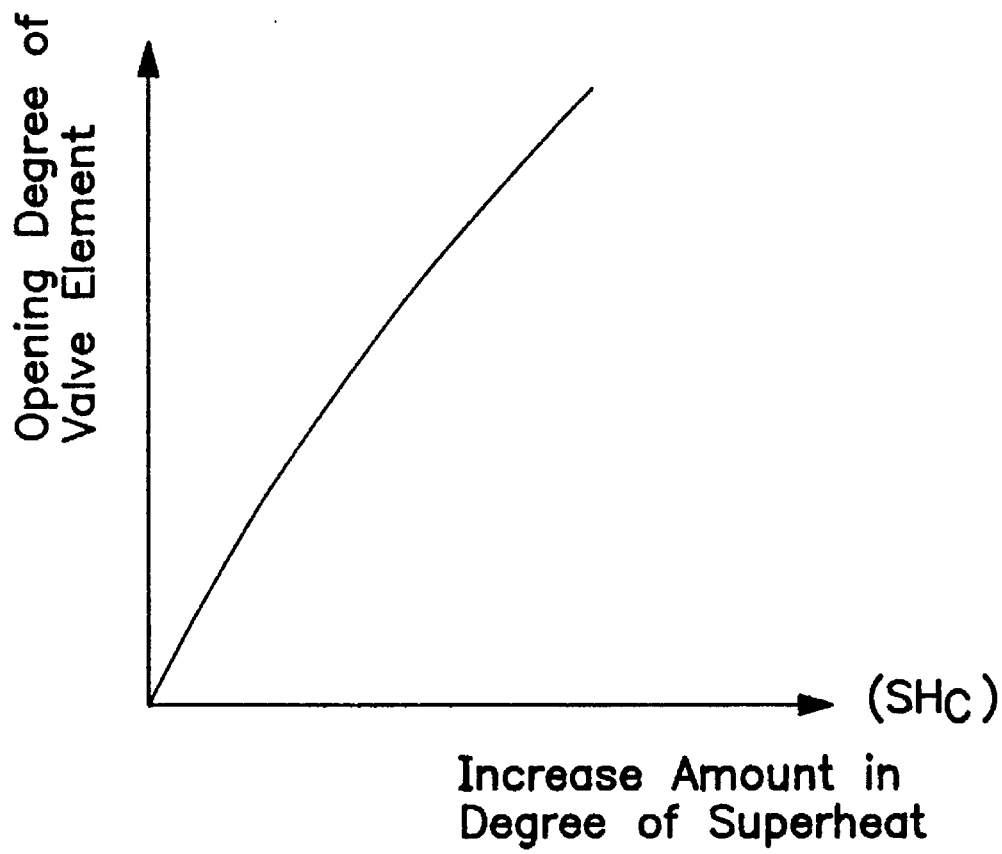
FIG. 5 is a graph illustrating the relationship between the amount of static superheat vs. opening degree of a valve element with respect to the first external pressure equalizing type expansion valve mechanism shown in FIGS. 1 and 2.
Figure 6:
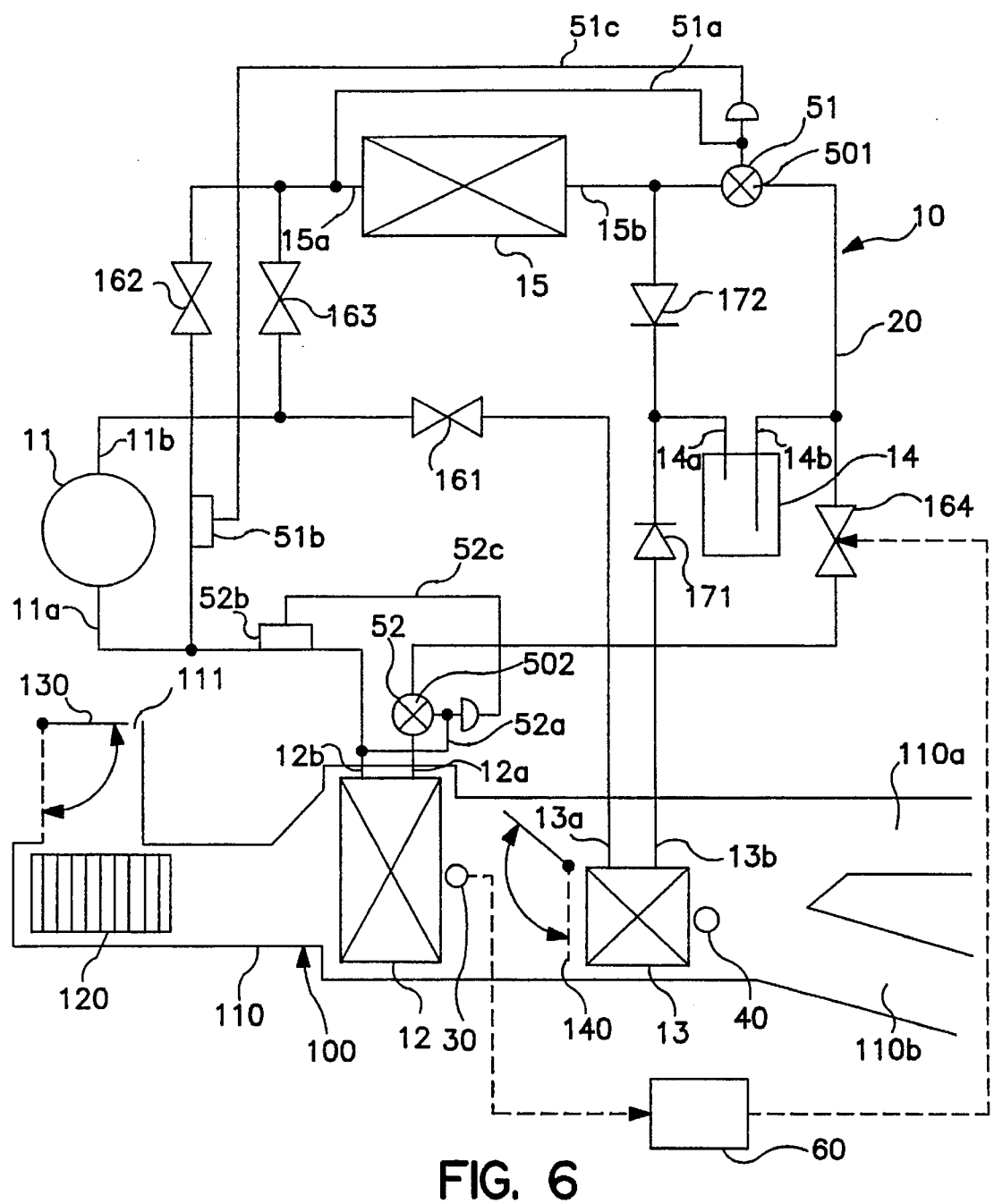

With reference to FIGS. 3 and 7, in the condition where the temperature of the ambient air outside the automobile is in an intermediate range, for example, 10° C.~20° C., the static superheat $SH_1$ with respect to the first external pressure equalizing type expansion valve mechanism 51 which is associated with external heat exchanger 15 is relatively greater than the static superheat $SH_2$ with respect to the second external pressure equalizing type expansion valve mechanism 52 which is associated with first internal heat exchanger 12. Therefore, the opening degree of valve element 514*a* of the first external pressure equalizing type expansion valve mechanism 51 is relatively smaller than the opening degree of the valve element of the second external pressure equalizing type expansion valve mechanism 52. As a result, a portion of the refrigerant which flows into external heat exchanger 15 flows into the first internal heat exchanger 12. Therefore, the temperature of the air blowing from first internal heat exchanger 12 sufficiently drops.

Accordingly, even when the heating-dehumidifying mode of operation is carried out when the temperature of the air outside the automobile is in the intermediate range, i.e., 10° C.~20° C., the dehumidifying operation at first internal heat exchanger 12 is effectively carried out.

However, when the heating-dehumidifying mode operation is carried out when the temperature of the ambient air outside the automobile is in yet another low range, for example, 0° C.~10° C., the temperature of the air blowing from first internal heat exchanger 12 may drop. Therefore, frost may form at the exterior surface of first internal heat exchanger 12 when the heating-dehumidifying mode of operation is carried out when the temperature of the ambient air outside the automobile is about 0° C.~10° C. In order to address this, automotive air conditioning system 100 includes a control device 60.

With reference to FIG. 6, control device 60 is electrically connected to both fourth electromagnetic valve 164 and first thermo-sensor 30, which is associated with first internal heat exchanger 12. Control device 60 is operational in heating-dehumidifying mode. Control device 60 receives the electric signal $S_{eva}$ representative of the temperature $T_{eva}$ sensed by first thermo-sensor 30. Control device 60 controls the opening and closing of fourth electromagnetic valve 164 as illustrated in FIG. 9.

Figure 9:
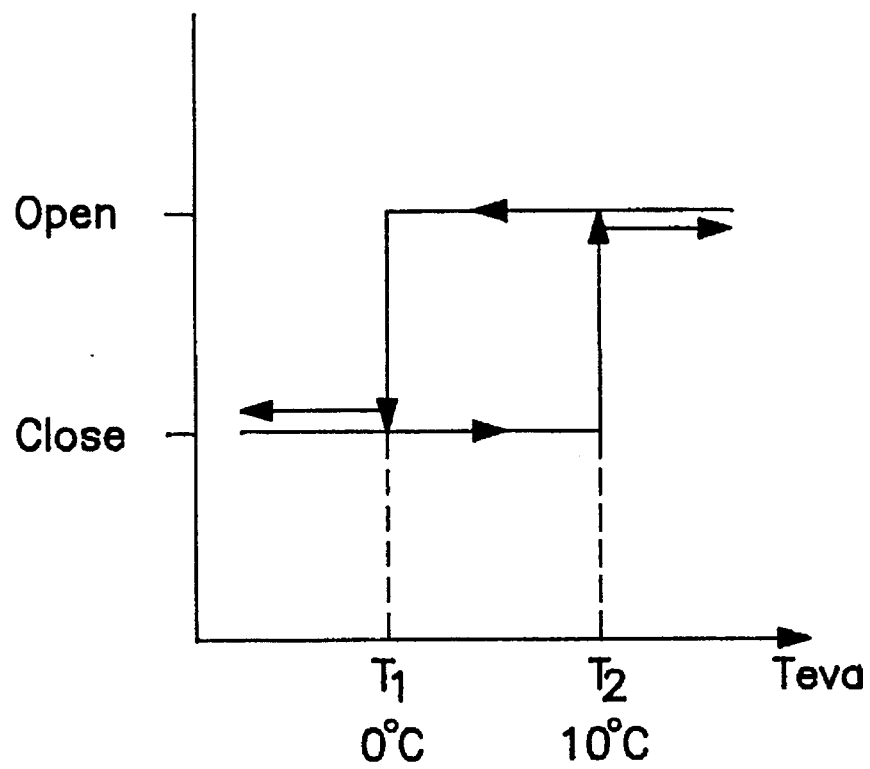
FIG. 9 is an operating diagram of the fourth electromagnetic valve shown in FIG. 6.

With reference to FIG. 9. when the sensed temperature $T_{eva}$ falls below a first boundary value $T_1$, for example, 0° C., fourth electromagnetic valve 164 is closed by the control device 60 as long as the sensed temperature $T_{eva}$ remains below the first boundary value $T_1$. The first boundary value $T_1$ is chosen as the temperature where frost begins to form on the exterior surface of first internal heat exchanger 12.

When the sensed temperature $T_{eva}$ rises above a second boundary value $T_2$, for example, 10° C., which is higher than the first boundary value $T_1$, fourth electromagnetic valve 164 is opened by control device 60 as long as the sensed temperature $T_{eva}$ remains above the second boundary value $T_2$. Thus, the flow of refrigerant into first internal heat exchanger 12 is blocked by fourth electromagnetic valve 164 while the sensed temperature $T_{eva}$ rises to the second boundary value $T_2$. Accordingly, the flow of refrigerant into first internal heat exchanger 12 is intermittently blocked in response to certain values of the sensed temperature $T_{eva}$.

As a result, the heat exchanging operation carried out at first internal heat exchanger 12 is effectively regulated by the control device 60. Therefore, frost is prevented from forming on the exterior surface of first internal heat exchanger 12 when the heating-dehumidifying mode operation is carried out and the temperature of the ambient air outside the automobile is low.

As described above, the preferred embodiment is applied to an automotive air conditioning system having a heat pump type refrigerant circuit, which performs in the cooling mode, the cooling-dehumidifying mode, the heating mode and the heating-dehumidifying mode of operations. However, the preferred embodiment can be applied to any type of an automotive air conditioning system having a heat pump type refrigerant circuit which can perform at least in the heating mode and the heating-dehumidifying mode.

Moreover, first thermo-sensor 30 may be positioned to sense the temperature of the air passing through first internal heat exchanger 12. Alternatively, first thermo-sensor 30 may be positioned to sense the temperature of the refrigerant upstream of first internal heat exchanger 12. Alternatively, the pressure of the refrigerant upstream of first internal heat exchanger 12 may be sensed instead of the temperature of the refrigerant.

This invention has been described in detail in connection with the preferred embodiment. The embodiment, however, is merely for example only and the invention is not restricted thereto. It will be understood by those skilled in the art that other variations and modifications can easily be made within the scope of this invention as defined by the appended claims.

I claim:

1. An automotive air conditioning system comprising;

a duct for conducting air therethrough, said duct member having a first end and a second end opposite to the first end;

a refrigerant circuit comprising a first and second internal heat exchangers located within said duct member, and an external heat exchanger located outside said duct member, said first internal heat exchanger being positioned upstream with respect to said second internal heat exchanger, said refrigerant circuit being charged with a refrigerant which flows through said first and second internal heat exchangers and said external heat exchanger so that a heat exchanging operation is carried out between said refrigerant and the air passing along an exterior surface of said first and second internal heat exchangers and said external heat exchanger;

said refrigerant circuit further comprising changeover means for changing over a direction of flow of said refrigerant such that, in one operational state, said external heat exchanger performs as an evaporator and said second internal heat exchanger performs as a condenser, and such that in another operational state, said external heat exchanger and said first internal heat exchanger perform as an evaporator and said second internal heat exchanger performs as a condenser;

said refrigerant circuit further comprising a first pressure equalizing type expansion valve mechanism associated with said external heat exchanger, said first expansion valve mechanism regulating a flow amount of the refrigerant flowing into said external heat exchanger in response to the temperature of the refrigerant at a position upstream of said external heat exchanger, and a second pressure equalizing type expansion valve mechanism associated with said first internal heat exchanger, said second expansion valve mechanism regulating a flow amount of the refrigerant flowing into said first internal heat exchanger in response to the temperature of the refrigerant at a position upstream to said first internal heat exchanger;

said first pressure equalizing type expansion valve mechanism having a P–T characteristic curve such that a static superheat curve intersects a saturated first refrigerant vapor curve when the temperature of the refrigerant at the position upstream of said external heat exchanger is relatively low;

said second pressure equalizing type expansion valve mechanism having a P–T characteristic curve such that a static superheat curve generally extends parallel to a saturated first refrigerant vapor curve.

2. The automotive air conditioning system of claim 1 wherein said first expansion valve mechanism comprises a thermo-sensing tube which senses the temperature of the refrigerant at a position upstream to said external heat exchanger.

3. The automotive air conditioning system of claim 2 wherein said thermo-sensing tube is charged with a refrigerant which is different from the refrigerant in the refrigerant circuit.

4. The automotive air conditioning system of claim 1 wherein said first expansion valve mechanism is an external pressure equalizing type expansion valve mechanism.

5. The automotive air conditioning system of claim 4 wherein said second expansion valve mechanism is an external pressure equalizing type expansion valve mechanism.

6. The automotive air conditioning system of claim 1 wherein said first expansion valve mechanism is an internal pressure equalizing type expansion valve mechanism.

7. The automotive air conditioning system of claim 6 wherein said second expansion valve mechanism is an internal pressure equalizing type expansion valve mechanism.

8. The automotive air conditioning system of claim 1 where in said changeover means comprises a plurality of electromagnetic valves.

9. The automotive air conditioning system of claim 8 wherein one of said plurality of said electromagnetic valves is opened to allow the refrigerant to flow into said first internal heat exchanger when said external heat exchanger and said first internal heat exchanger function as an evaporator and said second internal heat exchanger functions as a condenser.

10. The automotive air conditioning system of claim 9 further comprising a control means for controlling said one of said plurality of electromagnetic valves so as to intermittently allow the refrigerant to flow into said first internal heat exchanger in response to the temperature of the air downstream of said first internal heat exchanger.

11. The automotive air conditioning system of claim 10 wherein said control means closes said one of said plurality of electromagnetic valves as long as the temperature of the air downstream of said first internal heat exchanger rises to a first predetermined valve.

12. The automotive air conditioning system of claim 10 wherein said control means opens said one of said plurality of electromagnetic valves as long as the temperature of the air downstream of said first internal heat exchanger drops to a second predetermined valve.

13. The automotive air conditioning system of claim 9 further comprising a control means for controlling said one of said plurality of electromagnetic valves so as to intermittently allow the refrigerant to flow into said first internal heat exchanger in response to the temperature of the air passing though said first internal heat exchanger.

14. The automotive air conditioning system of claim 9 further comprising a control means for controlling said one of said plurality of electromagnetic valves so as to intermittently allow the refrigerant to flow into said first internal heat exchanger in response to the pressure of the refrigerant at a position upstream to said first internal heat exchanger.

15. The automotive air conditioning system of claim 9 further comprising a control means for controlling said one of said plurality of electromagnetic valves so as to intermittently allow the refrigerant to flow into said first internal heat exchanger in response to the temperature of the refrigerant at a position upstream to said first internal heat exchanger.

* * * * *